United States Patent
Aldana et al.

(10) Patent No.: US 12,122,077 B2
(45) Date of Patent: Oct. 22, 2024

(54) FORMING COMPLEX GEOMETRIES USING INSERT MOLDING

(71) Applicant: Microsoft Technology Licensing, LLC, Redmond, WA (US)

(72) Inventors: Leonardo Aldana, Tracy, CA (US); Michael James Louris, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 17/444,730

(22) Filed: Aug. 9, 2021

(65) Prior Publication Data
US 2022/0355518 A1     Nov. 10, 2022

Related U.S. Application Data

(60) Provisional application No. 63/186,004, filed on May 7, 2021.

(51) Int. Cl.
*B29C 45/14*   (2006.01)
*B29C 45/00*   (2006.01)
*B29L 31/34*   (2006.01)

(52) U.S. Cl.
CPC .......... *B29C 45/0055* (2013.01); *B29C 45/14* (2013.01); *B29C 2045/0058* (2013.01); *B29L 2031/3475* (2013.01)

(58) Field of Classification Search
CPC .............. B29C 45/14; B29C 45/14377; B29C 2793/009; B29C 2045/1454
See application file for complete search history.

(56) References Cited

U.S. PATENT DOCUMENTS

| | | |
|---|---|---|
| 6,076,258 A | 6/2000 | Abe |
| 8,784,715 B2 | 7/2014 | Oohashi et al. |
| 9,442,305 B2 | 9/2016 | Blum et al. |

(Continued)

FOREIGN PATENT DOCUMENTS

| | | |
|---|---|---|
| DE | 19923725 C1 | 7/2000 |
| EP | 3438786 A1 | 2/2019 |

(Continued)

OTHER PUBLICATIONS

"Epson Uses Machined Prototypes to Set Sights on Improving Smart Glasses", Retrieved from: https://web.archive.org/web/20190317204923/https:/www.protolabs.com/resources/success-stories/epson/, Mar. 17, 2019, 5 Pages.

(Continued)

*Primary Examiner* — Edmund H Lee
(74) *Attorney, Agent, or Firm* — Alleman Hall & Tuttle LLP

(57) ABSTRACT

Examples are disclosed herein that relate to creating undercuts and other complex geometries in an injection molded article. One example provides a method of forming an injection molded article comprising an undercut structure, the method comprising inserting an insert piece into a mold for forming the molded article, the insert piece comprising sacrificial material, injection-molding the molded article, thereby incorporating the insert piece into the injection molded article, and machining the insert piece to form the undercut structure from the sacrificial material.

20 Claims, 7 Drawing Sheets

(56) References Cited

U.S. PATENT DOCUMENTS

| | | |
|---|---|---|
| 9,868,234 B2 * | 1/2018 | Yu ..................... B29C 45/14631 |
| 2007/0224864 A1 | 9/2007 | Burns et al. |
| 2008/0017304 A1 | 1/2008 | Sell et al. |
| 2009/0017242 A1 | 1/2009 | Weber et al. |
| 2010/0147482 A1 | 6/2010 | Sanford et al. |
| 2015/0202841 A1 | 7/2015 | Verreault et al. |
| 2016/0007493 A1 * | 1/2016 | Hsu ...................... G06F 1/1637 |
| | | 312/223.1 |
| 2016/0107346 A1 | 4/2016 | Kang et al. |
| 2019/0160717 A1 | 5/2019 | Lowe |
| 2019/0271856 A1 | 9/2019 | Mape et al. |

FOREIGN PATENT DOCUMENTS

| | | |
|---|---|---|
| EP | 3613551 A1 | 2/2020 |
| JP | 2013223136 A | 10/2013 |
| JP | 2015121691 A | 7/2015 |
| WO | 0242056 A1 | 5/2002 |
| WO | WO2018110293 * | 6/2018 |
| WO | WO2019235299 * | 12/2019 |

OTHER PUBLICATIONS

"International Search Report and Written Opinion Issued in PCT Application No. PCT/US22/024156", Mailed Date: Jul. 26, 2022, 14 Pages.

* cited by examiner

FORMING COMPLEX GEOMETRIES USING INSERT MOLDING

CROSS REFERENCE TO RELATED APPLICATIONS

This application claims priority to U.S. Provisional Patent Application Ser. No. 63/186,004, filed May 7, 2021, entitled, "FORMING COMPLEX GEOMETRIES USING INSERT MOLDING", the entirety of which is hereby incorporated herein by reference for all purposes.

BACKGROUND

In an injection molding process, a molded article is made by injecting a softened material into a mold and then hardening the material in the mold.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to insert molding an article having complex undercuts and/or variations in wall thickness. One example provides a method of forming an injection molded article comprising an undercut structure. The method comprises inserting an insert piece into a mold for forming the molded article, the insert piece comprising sacrificial material, injection-molding the molded article, thereby incorporating the insert piece into the injection molded article, and machining the insert piece to form the undercut structure from the sacrificial material.

Another example provides a method of forming an injection molded article comprising features having different thicknesses. The method comprises obtaining an insert piece comprising a moldable material, the insert piece having a first, greater thickness, inserting the insert piece into a mold for forming the molded article, the molded article comprising a portion adjacent to the insert piece with a second, lesser thickness than the first, greater thickness, and injecting the moldable material into the mold, thereby bonding the insert piece to the portion adjacent to the insert piece.

Another example provides a method of forming a frame for a wearable device. The method comprises obtaining an insert piece comprising a moldable material, the insert piece having a first, greater thickness and comprising sacrificial material, inserting the insert piece into a mold for forming the molded frame, the molded frame comprising a portion adjacent to the insert piece with a second, lesser thickness than the first, greater thickness, injecting the moldable material into the mold, thereby incorporating the insert piece into the injection molded frame, and machining the insert piece to form an undercut structure of the injection molded frame from the sacrificial material.

DETAILED DESCRIPTION

Figure 1:
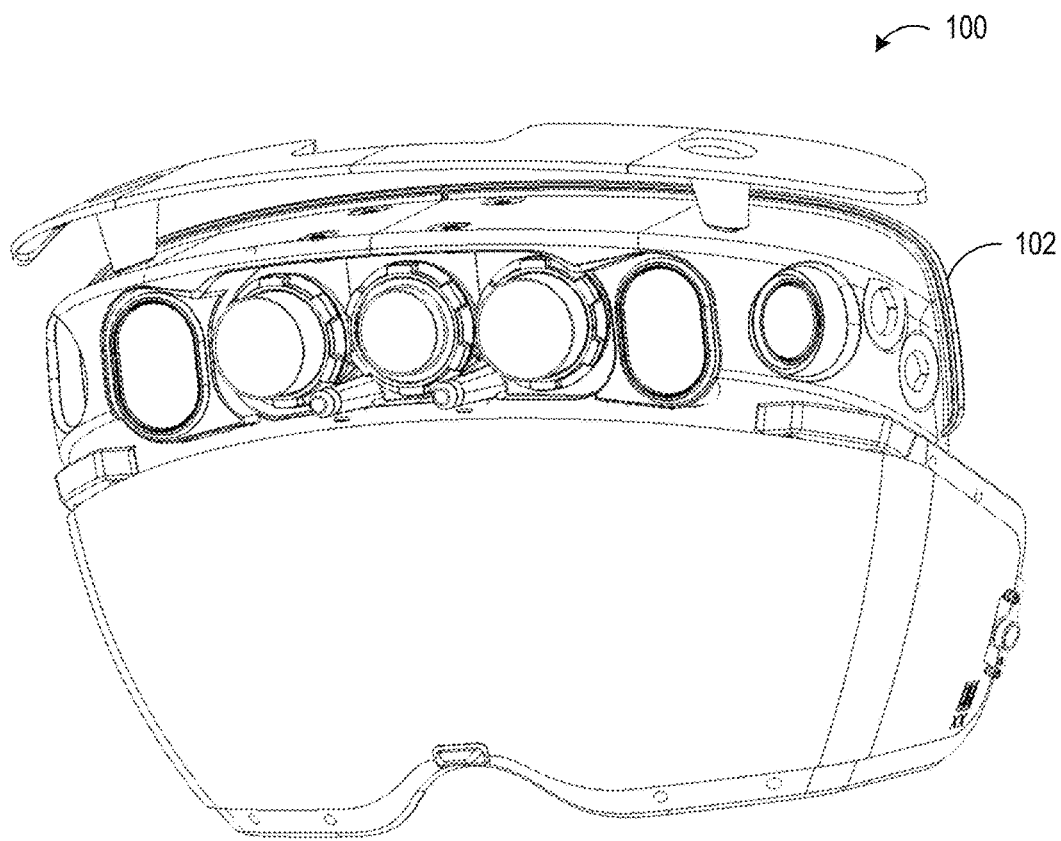
FIG. 1 shows an example wearable device that includes an example molded article.

Injection molding of complex parts can pose various challenges. For example, complex parts may include undercut regions, which are regions that block removal of a molded part from a mold. To allow the molding of undercut parts, molds can include sliders and/or other moveable parts that allow a blocking surface of the mold to be moved out of the way of the undercut portion of the part. Such moveable parts also may be referred to as tool actions. However, some undercuts may be difficult to accommodate via such tool actions.

As another difficulty, a polymer used in injection molding may shrink substantially as it hardens in a mold. For parts with varying thicknesses, such shrinking can cause warpage of the part in regions where relatively thinner portions meet relatively thicker portions, if the differences in thickness are too great. As such, it may be advantageous to design the molded part with a similar wall thickness all over. However, designing a part to have a consistent nominal wall thickness may in some cases be difficult. For example, some molded parts have ribs to reduce warpage along a long wall, or bosses to receive screws or other fasteners, which may have relatively thicker walls. In contrast, other portions of walls may be reduced in thickness because of space limitations, functionality requirements, and/or cosmetic considerations. In some cases, in order to achieve a desired functionality and appearance, such as two walls that are very close to each other, a thin steel piece may be inserted between the two walls to maintain the desired shape of the walls during the molding process. However, the steel piece may result in a hot spot that can pose problems during cooling.

Accordingly, examples are disclosed herein that relate to forming injection molded articles having complex geometries with undercuts and/or differing wall thicknesses by the use of insert molding followed by machining. Insert molding is a technique used to form molded articles by inserting preformed parts into a mold, such that the preformed parts are overmolded during injection molding, and thereby incorporated into the final molded article. As described in more detail below, an insert piece with a first, greater thickness is molded separately from a final injection molded article. The insert piece is incorporated into the molded article by insert molding after it has cooled and undergone shrinkage. During insert molding, hot resin is overmolded around the insert without causing the bulk of the insert to substantially soften and expand. In this manner, thicker regions of an injection molded article can be formed without experiencing the shrinkage and warpage effects that the achieved wall thickness may have if molded via a single tool. Then, machining can be used to remove sacrificial material from the insert to create a desired wall profile, such as to create undercut features that are difficult or not possible to form using tool actions. In some examples, a same polymer material may be used for the insert and the overmolding material. Using the same resin for the insert and the overmolded part provides for bonding compatibility between the layers of resin, enabling a thermal and mechanical bond between the two components in the final molded article.

FIG. 1 shows an example wearable device 100 that includes an injection molded article 102 as a component. Wearable device 100 takes the form of a head-mounted display device, and injection molded article 102 is configured to support various sensors, some of which are schematically shown. Molded article 102 may help to isolate and protect internal components from environmental elements and from damage during transportation, use and handling. Molded article 102 further may provide access to the internal components for assembly, rework and service, provide a platform for optical alignment between sensors and displays, provide structures to mount other devices, dissipate heat from internal components, and/or perform other functions. Molded article 102 also may be configured to meet certain test requirements, e.g. to provide a sufficient barrier to moisture, and to meet drop and thermal tests.

Figure 2:
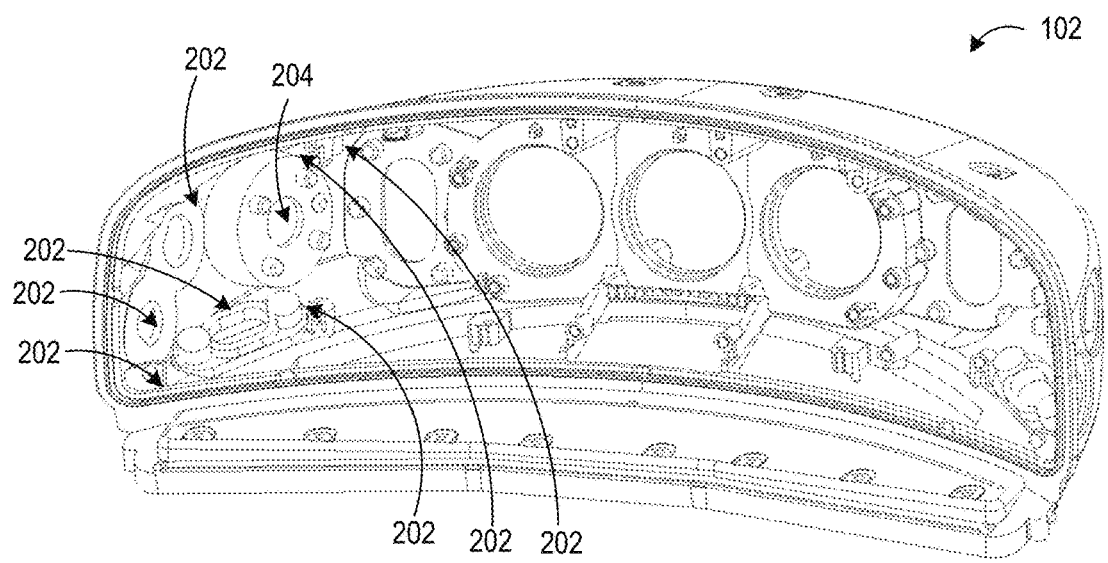
FIG. 2 shows the molded article of the device of FIG. 1.

In view of these diverse considerations, molded article 102 has a complex design with widely varying thicknesses and undercut structures that pose challenges for molding. FIG. 2 shows molded article 102 in more detail. As indicated by arrows including arrow 202, molded article 102 includes various undercuts to provide for certain functions of the resulting product. The undercuts may help to maintain a relatively small size for the molded article 102. However, the depicted undercuts are difficult to form with tool-actions alone. Molded article 102 also includes walls of varying thicknesses, such as where windows for sensors are formed, e.g. at 204. As mentioned above, such varying thicknesses can cause warpage, deformation and sink marks of the molded article in regions where relatively thinner portions meet relatively thicker portions, due to shrinkage during the molding process.

Thus, as mentioned above, one or more inserts may be molded into the molded article 102 during injection molding. The inserts can be used to provide sacrificial material from which the undercuts and/or other structures can be machined after molding. Forming the thicker sacrificial material by separate molding of the insert piece, instead of forming the thicker structure in a same mold process as the thinner portions of the molded article, helps to prevent warpage caused by shrinkage of the thicker structure. Further, an insert can be shaped to allow the molded article to be readily removed from a mold prior to machining structures that would be difficult undercuts during molding. Also, an insert can be formed from a same material as the overmolding material, allowing the structures to fuse during injection molding of the overmolding material, thereby forming a robust combined structure for machining.

Figure 3:
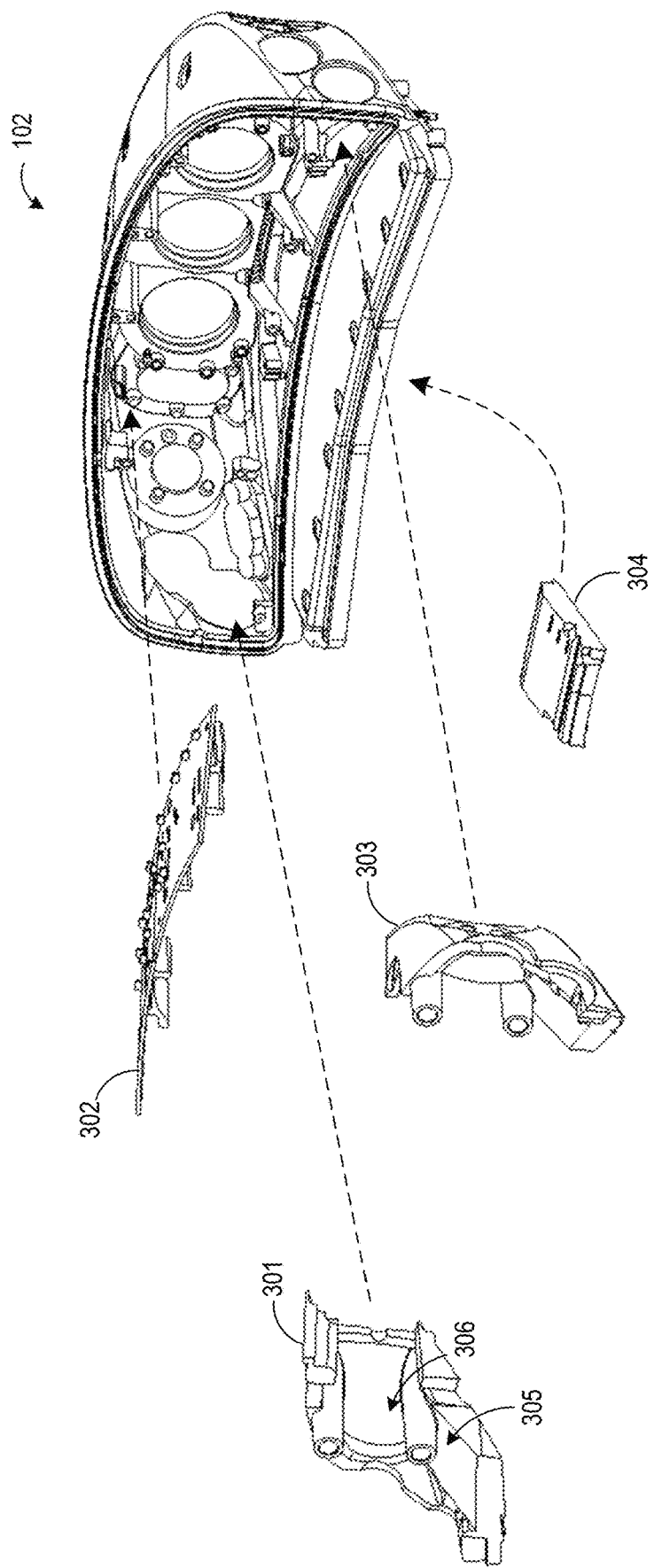
FIG. 3 shows an exploded view of the molded article of FIG. 2 prior to machining, with example insert pieces shown separately from an overmolded portion.
Figure 4:
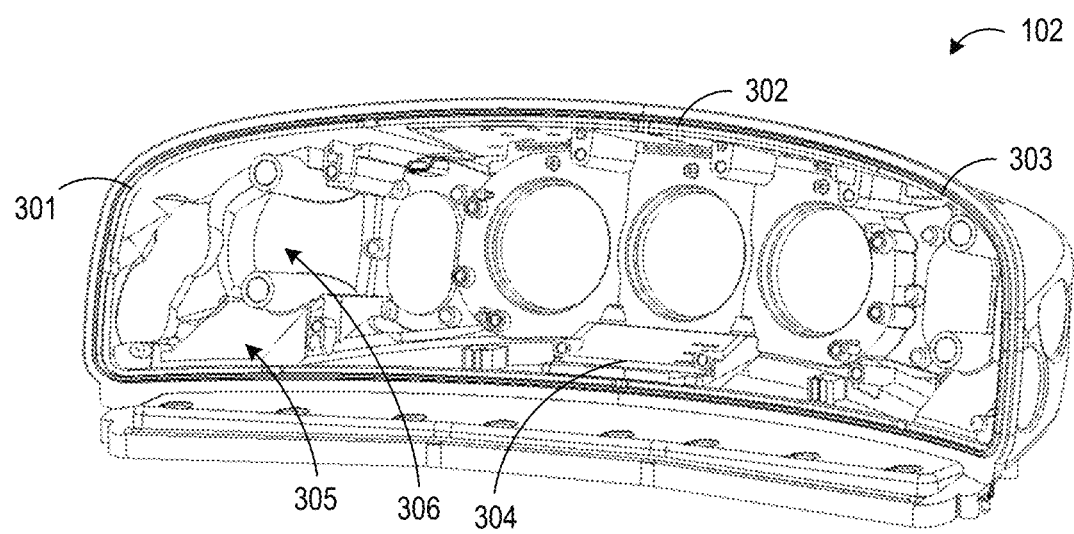
FIG. 4 shows the molded article of FIG. 2 prior to machining, with the insert pieces in place relative to the overmolded portion.

FIG. 3 shows an exploded view of molded article 102, illustrating inserts prior to being machined into final form, and FIG. 4 an unexploded view of molded article 102, also illustrating inserts prior to machining. Insert 301 and insert 303 are relatively thick molded structures that include sacrificial material (e.g. in region 305) for the machining of undercut structures 202, as well as for the formation of relatively thicker mounts for sensors are formed (e.g. in region 306). As can be seen in FIG. 4, the inserts 301, 303 do not have the undercuts 202, and thus allow molded article 102 to be readily removed from an injection mold. Other inserts also may be included in the injection molding process. For example, insert 302 is a sheet metal piece that is positioned at a top of the molded article 102, and insert 304 is a bracket positioned at a bottom of the molded article 102.

Figure 5:
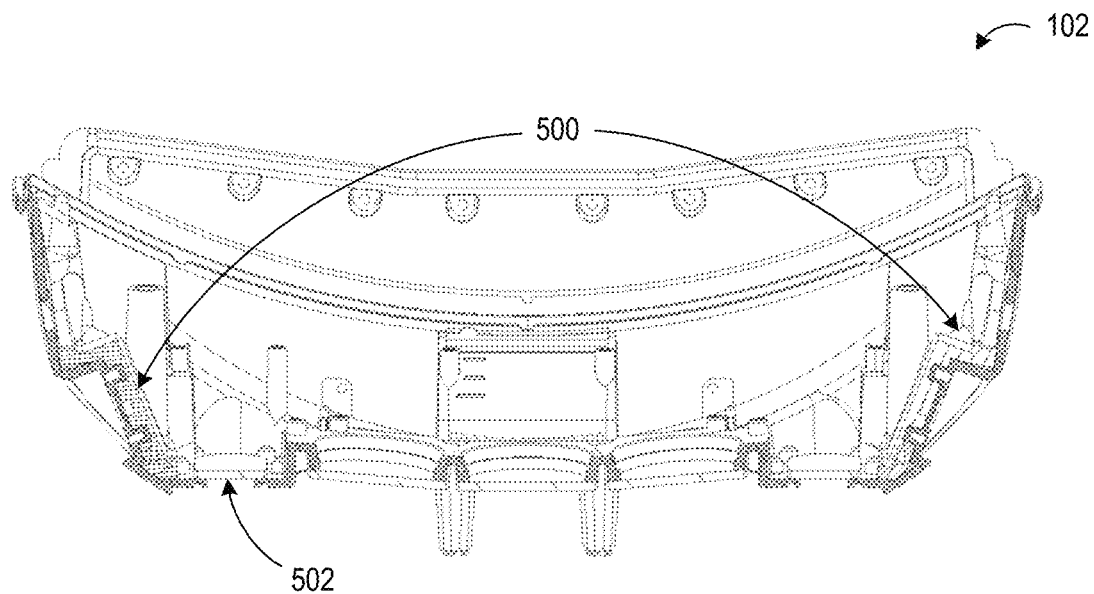
FIG. 5 shows a partially cut-away view of the molded article of FIG. 2.

FIG. 5 shows a sectional view of molded article 102. As mentioned above, molded article 102 has relatively thick wall cross-sections at 500 provided by insert 301 and insert 303 to provide sacrificial material suitable for machining. The molded article 102 also has relatively thin, nominal wall thickness areas, such as area 502, adjacent to the thicker regions. By forming inserts 301 and 303 in a separate molding process, inserts 301 and 303 may avoid shrinkage during the overmolding process, and thus avoid warping relatively thinner wall areas adjacent to the inserts, such as area 502. After cooling, any sacrificial portions of the inserts may be machined to produce more detailed structures, such as undercuts.

Figure 6:
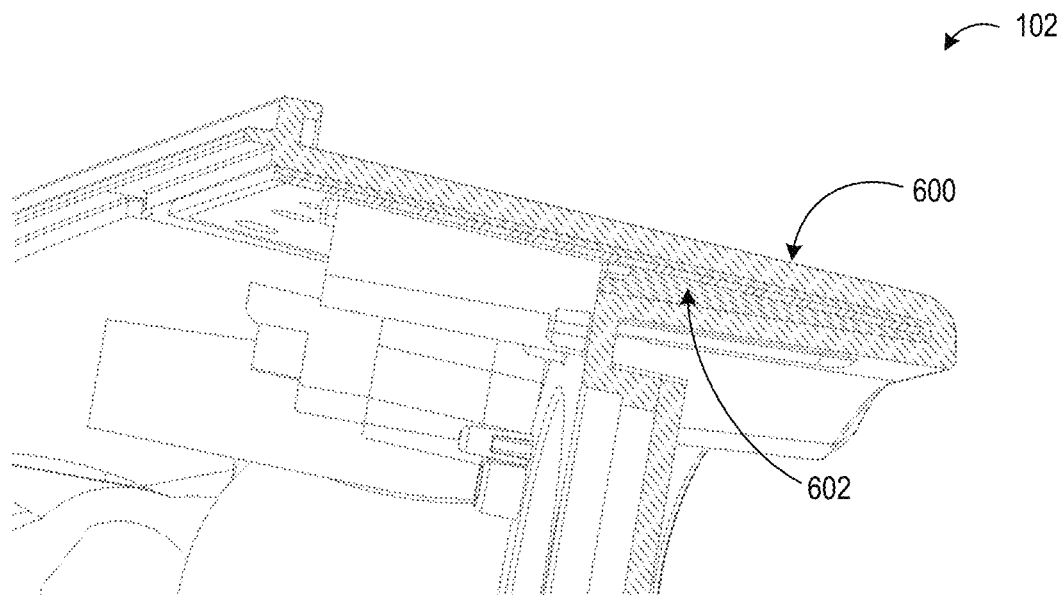
FIG. 6 shows a close-up partially cut-away view of the molded article of FIG. 2, and illustrates an insert overmolded within the molded article.

FIG. 6 shows a magnified sectional view of molded article 102, with portions of an insert visible between overmolded walls 600 and 602. Here, the use of the insert in a relatively tight spot in a mold may help to avoid the use of a thin metal portion in the tool between closely spaced walls to form the structure, which can create unwanted hot spots in the cooling process, and weak and/or sharp steel conditions.

Figure 7:
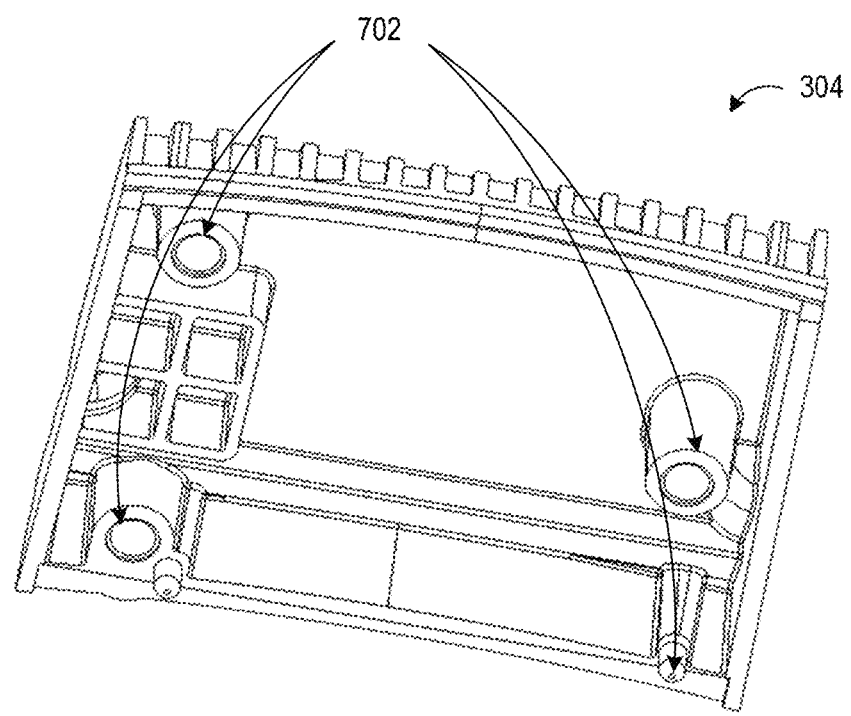
FIGS. 7 and 8 show views of example inserts having guide features.
Figure 8:
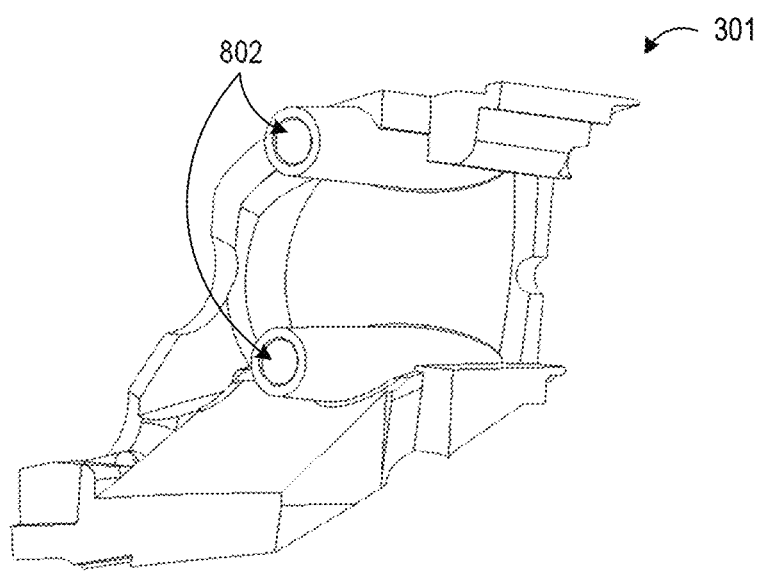

As mentioned above, after the insert molding process, the sacrificial material in molded article 102 provided by the inserts may then be machined to create undercuts and other geometries. The molded article 102 may be machined using computer numerical control (CNC) milling, and/or using any other suitable machining process(es). In some examples, the inserts may include features that help with the machining process. FIGS. 7 and 8 respectively show more detailed views of example inserts 304 and 301, and illustrate features 702, 802 to guide a CNC machine during the machining process.

Figure 9:
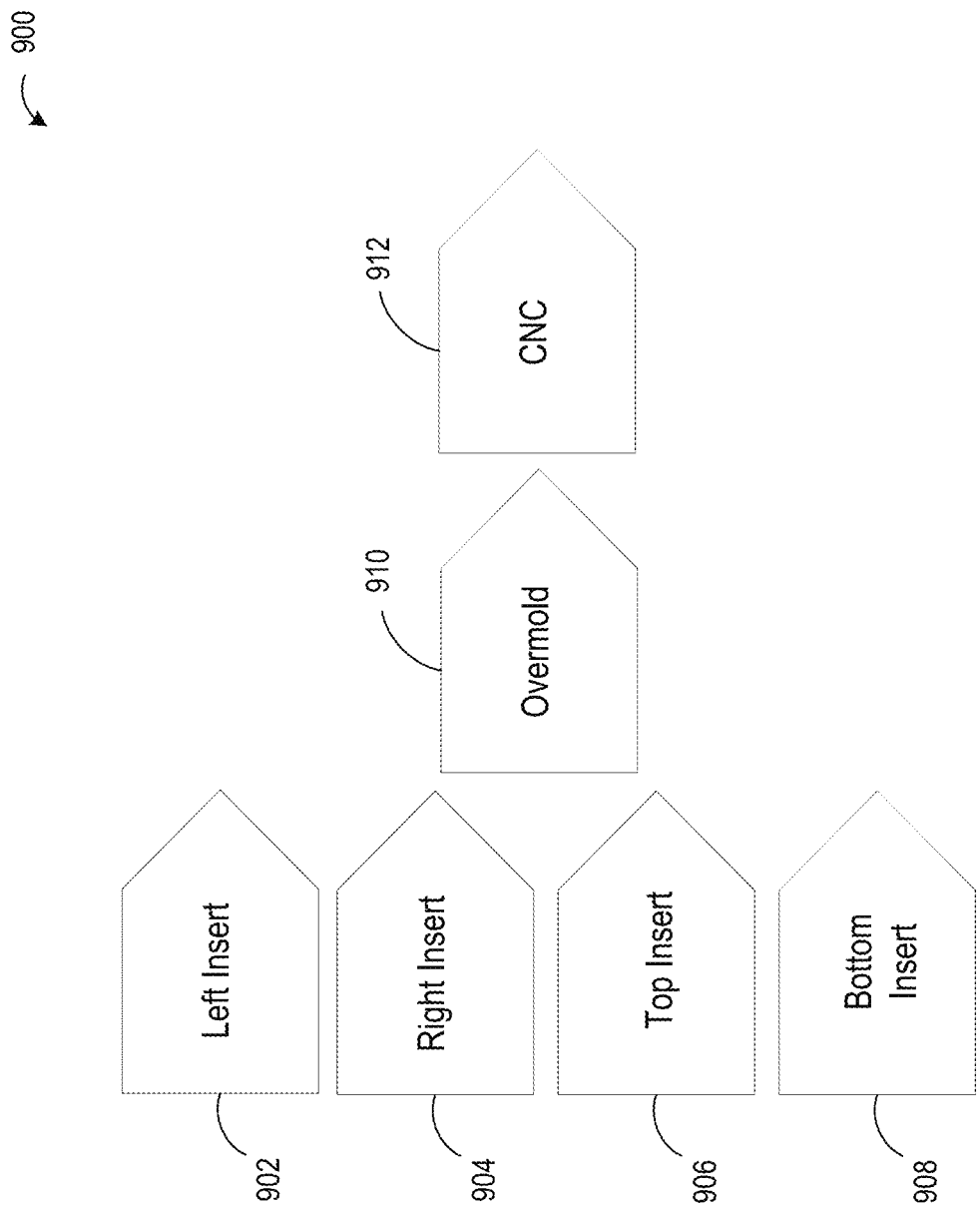
FIG. 9 shows a flow diagram illustrating an example method of injection molding an article.

FIG. 9 shows a flow diagram illustrating an example method 900 of injection molding an article. Method 900 comprises individually forming inserts 902, 904, 906, and 908. As mentioned above, one or more inserts (e.g. those shown at 902 and 904) may be injection molded, and thus will undergo cooling and shrinkage. include sacrificial material that can be machined into more complex shapes in a later process. Next, at 910, the inserts are inserted into a mold for forming a molded article, and then resin is injected into the mold, thereby incorporating the previously molded inserts into the molded article. As described above, because one or more inserts were molded and cooled as a separate process (e.g. those shown at 902 and 904), the inserts may remain dimensionally stable during the insert molding process, thus helping to prevent unwanted shrinkage and warping of the molded article formed in the insert molding process. Further, in some examples, the same polymer material may be used for the inserts and the molded article, which may help to form a fused interface between the insert and the overmolding materials. Continuing, sacrificial materials on the inserts are then machined, at 912, to produce desired undercuts and/or other geometries. In some examples, such undercuts may otherwise not be achievable via traditional injection molding processes. This process also allows relatively thick walls to be produced in certain areas while keeping other walls relatively thin. In some examples, the inserts may include guide features to assist in the subsequent machining process, which may include CNC milling and/or any other suitable process.

Figure 10:
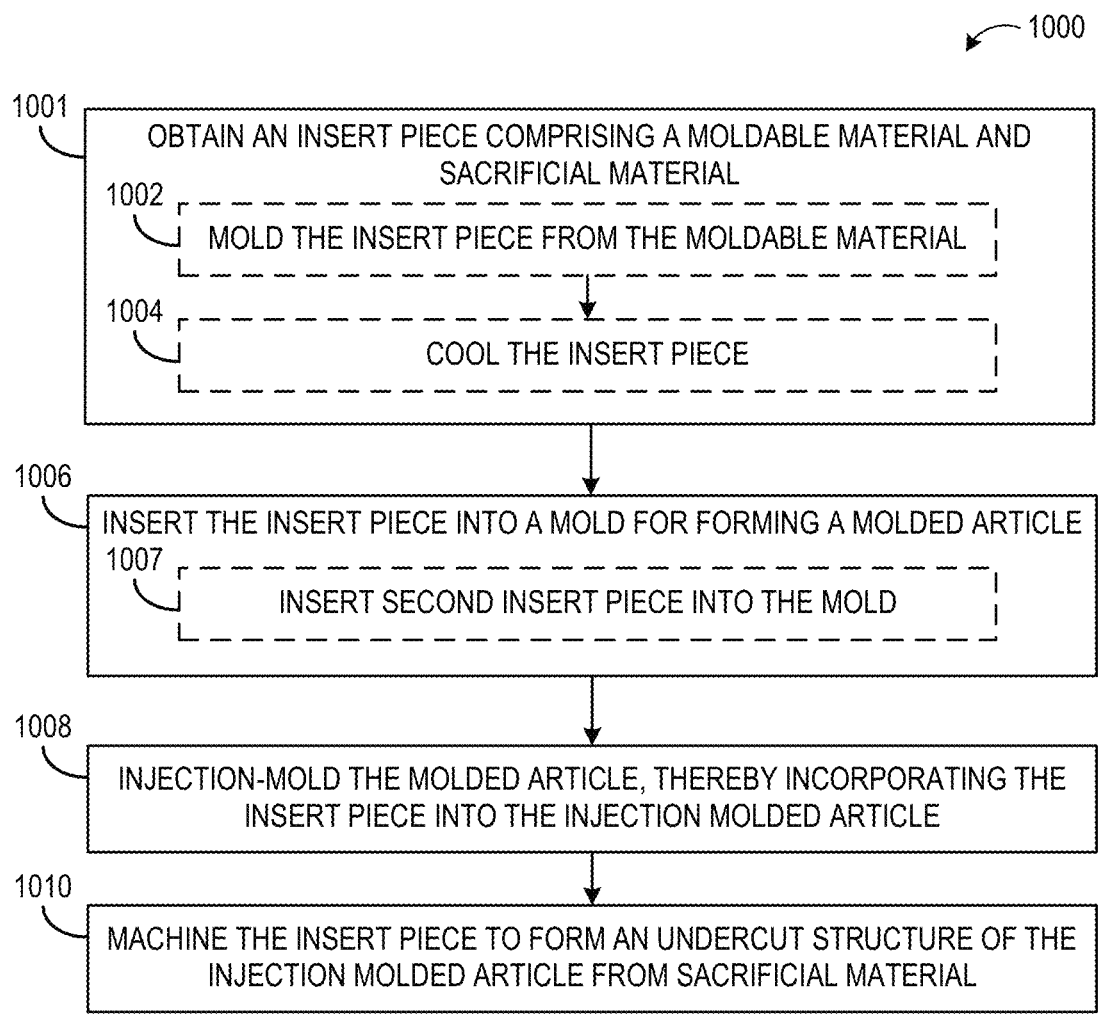
FIG. 10 shows flow diagram illustrating another example method of injection molding an article.

FIG. 10 shows a flowchart of another example method 1000 of injection molding an article. Method 1000 includes, at 1001, obtaining an insert piece comprising a moldable material and sacrificial material. This may include, at 1002, molding an insert piece from the moldable material, and at 1004, cooling the insert piece, allowing the insert piece to undergo shrinkage. In other examples, the insert piece may be machined or formed in any other suitable manner. Next, method 1000 includes, at 1006, inserting the insert piece into a mold for forming a molded article, and optionally at 1007, inserting a second insert piece into the mold, as well as any additional insert pieces. Any additional insert pieces may be inserted into the mold. Method 1000 further includes, at 1008, injection-molding the molded article, thereby incorporating the insert piece into the injection molded article. The insert piece may have a first, greater thickness, and may be incorporated into the injection molded article adjacent to portions of the injection molded article that have a second, lesser thickness. Method 1000 further includes, at 1010, machining the insert piece to form an undercut structure of the injection molded article from sacrificial material, and/or to form other structures. As described above, this may include CNC milling, and/or any other suitable machining process. In this manner, undercut structures that would be difficult to form using sliders can be formed by machining the sacrificial material from the insert. Further, by forming the insert in a second process, the thickness used for the sacrificial material and/or relatively thicker regions of the final molded article can be formed without risking warpage caused by forming the thicker and thinner structures in a same molding process.

Another example provides a method of forming an injection molded article comprising an undercut structure, the method comprising inserting an insert piece into a mold for forming the molded article, the insert piece comprising sacrificial material, injection-molding the molded article, thereby incorporating the insert piece into the injection molded article, and machining the insert piece to form the undercut structure from the sacrificial material. The insert piece may additionally or alternatively include a first, greater thickness, and wherein the molded article comprises a portion adjacent to the insert piece having a second, lesser thickness than the first, greater thickness. Machining the insert piece may additionally or alternatively include CNC milling. The insert piece may additionally or alternatively include guide features for machining. The injection molded article may additionally or alternatively include a frame for a head-mounted device. The insert piece and the molded article may additionally or alternatively be formed from a same moldable material. Where the insert piece is a first insert piece, the method may additionally or alternatively include inserting a second insert piece into the mold for forming the molded article, and incorporating the second insert piece into the molded article. The insert piece and the molded article may additionally or alternatively be molded from a same material. The method may additionally or alternatively include molding the insert piece and cooling the insert piece prior to inserting the insert piece into the mold.

Another example provides a method of forming an injection molded article comprising features having different thicknesses, the method comprising obtaining an insert piece comprising a moldable material, the insert piece having a first, greater thickness, inserting the insert piece into a mold for forming the molded article, the molded article comprising a portion adjacent to the insert piece with a second, lesser thickness than the first, greater thickness, and injecting the moldable material into the mold, thereby bonding the insert piece to the portion adjacent to the insert piece. The insert piece may additionally or alternatively include sacrificial material, and the method may additionally or alternatively include machining the insert piece to form an undercut structure in the injection molded article from the sacrificial material. Machining the insert piece may additionally or alternatively include CNC milling. The injection molded article may additionally or alternatively include a frame for a head-mounted device. Where the insert piece is a first insert piece, the method may additionally or alternatively include inserting a second insert piece into the mold for forming the molded article, and incorporating the second insert piece into the molded article. The insert piece and the molded article may additionally or alternatively be formed from a same material. Obtaining the insert piece may additionally or alternatively include molding the insert piece and cooling the insert piece prior to inserting the insert piece into the mold.

Another example provides a method of forming a frame for a wearable device, comprising obtaining an insert piece comprising a moldable material, the insert piece having a first, greater thickness and comprising sacrificial material, inserting the insert piece into a mold for forming the molded frame, the molded frame comprising a portion adjacent to the insert piece with a second, lesser thickness than the first, greater thickness, injecting the moldable material into the mold, thereby incorporating the insert piece into the injection molded frame, and machining the insert piece to form an undercut structure of the injection molded frame from the sacrificial material. Where the insert piece is a first insert piece, the method may additionally or alternatively include molding a second insert piece from the moldable material and inserting the second insert piece into the mold to incorporate the second insert piece into the frame. The insert piece and the molded article may additionally or alternatively be formed from a same material. Obtaining the insert piece may additionally or alternatively include molding the insert piece and cooling the insert piece prior to inserting the insert piece into the mold.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of forming an injection molded article comprising an undercut structure, the method comprising:
    inserting an insert piece into a mold for forming the molded article, the insert piece comprising sacrificial material;
    injection-molding the molded article, thereby incorporating the insert piece into the injection molded article such that the insert piece is fused to the injection molded article without causing a bulk of the insert to soften and expand; and machining the incorporated insert piece to form the undercut structure from the sacrificial material.

2. The method of claim 1, wherein the insert piece comprises a first, greater thickness, and wherein the molded article comprises a portion adjacent to the insert piece having a second, lesser thickness than the first, greater thickness.

3. The method of claim 1, wherein machining the incorporated insert piece comprises CNC milling.

4. The method of claim 1, wherein the insert piece comprises guide features for machining.

5. The method of claim 1, wherein the injection molded article comprises a frame for a head-mounted device.

6. The method of claim 1, wherein the insert piece and the molded article are formed from a same moldable material.

7. The method of claim 1, wherein the insert piece is a first insert piece, and further comprising inserting a second insert piece into the mold for forming the molded article, and incorporating the second insert piece into the molded article.

8. The method of claim 1, wherein the insert piece and the molded article are molded from a same material.

9. The method of claim 1, further comprising molding the insert piece and cooling the insert piece prior to inserting the insert piece into the mold.

10. A method of forming an injection molded article comprising features having different thicknesses, the method comprising:
    obtaining an insert piece comprising a moldable material, the insert piece having a first, greater thickness;
    inserting the insert piece into a mold for forming the molded article, the molded article comprising a portion adjacent to the insert piece with a second, lesser thickness than the first, greater thickness; and
    injecting the moldable material into the mold, thereby bonding the insert piece to the portion adjacent to the insert piece such that the insert piece is fused to the portion adjacent to the insert piece without causing a bulk of the insert to soften and expand; and
    machining the bonded insert piece to form an undercut structure.

11. The method of claim 10, wherein the insert piece comprises sacrificial material.

12. The method of claim 11, wherein machining the bonded insert piece comprises CNC milling.

13. The method of claim 10, wherein the injection molded article comprises a frame for a head-mounted device.

14. The method of claim 10, wherein the insert piece is a first insert piece, and further comprising inserting a second insert piece into the mold for forming the molded article, and incorporating the second insert piece into the molded article.

15. The method of claim 10, wherein the insert piece and the molded article are formed from a same material.

16. The method of claim 10, wherein obtaining the insert piece comprises molding the insert piece and cooling the insert piece prior to inserting the insert piece into the mold.

17. A method of forming a molded frame for a wearable device, comprising:
    obtaining an insert piece comprising a moldable material, the insert piece having a first, greater thickness and comprising sacrificial material;
    inserting the insert piece into a mold for forming the molded frame, the molded frame comprising a portion adjacent to the insert piece with a second, lesser thickness than the first, greater thickness;
    injecting the moldable material into the mold, thereby incorporating the insert piece into the injection molded frame such that the insert piece is fused to the injection molded frame without causing a bulk of the insert to soften and expand; and
    machining the incorporated insert piece to form an undercut structure of the injection molded frame from the sacrificial material.

18. The method of claim 17, wherein the insert piece is a first insert piece, and further comprising molding a second insert piece from the moldable material and inserting the second insert piece into the mold to incorporate the second insert piece into the frame.

19. The method of claim 17, wherein the insert piece and the molded article are formed from a same material.

20. The method of claim 17, wherein obtaining the insert piece comprises molding the insert piece and cooling the insert piece prior to inserting the insert piece into the mold.

* * * * *